(12) United States Patent
Goldburt

(10) Patent No.: US 9,152,968 B2
(45) Date of Patent: Oct. 6, 2015

(54) SYSTEM FOR AND METHOD OF ACTING ON BEVERAGE BOTTLES

(75) Inventor: Tim Goldburt, Ardsley, NY (US)

(73) Assignee: Medea Inc., Pleasanton, CA (US)

( * ) Notice: Subject to any disclaimer, the term of this patent is extended or adjusted under 35 U.S.C. 154(b) by 0 days.

(21) Appl. No.: 11/821,349

(22) Filed: Jun. 22, 2007

(65) Prior Publication Data

US 2008/0319876 A1 Dec. 25, 2008

(51) Int. Cl.
*B65D 85/00* (2006.01)
*G06Q 30/02* (2012.01)
*G06Q 30/06* (2012.01)

(52) U.S. Cl.
CPC ............ *G06Q 30/02* (2013.01); *G06Q 30/0601* (2013.01)

(58) Field of Classification Search
USPC ........ 235/381, 380, 379; 340/10.1, 5.61, 531, 340/384.7, 691.2, 691.6, 692; 705/1, 2, 14, 705/26, 16, 51; 706/21, 50
See application file for complete search history.

(56) References Cited

U.S. PATENT DOCUMENTS

| | | | |
|---|---|---|---|
| 97,669 A | 12/1869 | Millen |
| D20,656 S | 3/1891 | Dawes |
| D23,100 S | 3/1894 | Fay et al. |
| 716,793 A | 12/1902 | Vogeler |
| 823,008 A | 6/1906 | Vendig |
| 1,262,788 A | 4/1918 | Heidenreich |
| 1,554,191 A | 9/1925 | Alexander |
| 1,653,608 A | 3/1927 | Allen |
| 1,686,354 A | 3/1927 | Wallace |
| 1,769,147 A | 12/1927 | Benjamin |
| 1,856,550 A | 12/1928 | Guenard |
| 1,770,093 A | 2/1929 | West |
| D79,958 S | 11/1929 | De Wagner |
| D85,487 S | 7/1931 | Meyer |
| 3,864,976 A | 2/1975 | Parker |
| 3,965,590 A | 6/1976 | Algaze |
| 3,996,879 A | 12/1976 | Walton |
| 4,607,756 A | 8/1986 | Courtman |
| D285,903 S | 9/1986 | Courtman |
| 4,765,465 A | 8/1988 | Yamada et al. |
| 4,928,412 A | 5/1990 | Nishiyama |
| D314,308 S | 2/1991 | Cogswell |
| D317,123 S | 5/1991 | Colani |

(Continued)

FOREIGN PATENT DOCUMENTS

| | | |
|---|---|---|
| JP | 07-027624 | 1/1995 |
| WO | WO 03/099039 | 12/2003 |
| WO | WO 2010/138107 | 12/2010 |

OTHER PUBLICATIONS

Tech-Recipes, http://www.tech-recipes.com/rx/2484/iphone_change_the_auto_lock_delay/, Jun. 29, 2007.

(Continued)

*Primary Examiner* — Scott Zare
*Assistant Examiner* — Rokib Masud
(74) *Attorney, Agent, or Firm* — Lowenstein Sandler LLP

(57) ABSTRACT

A system for and a method of acting on beverage bottles has a plurality of bottles each provided with a device selected from the group consisting of an electrical device and an electronic device integrated in each of the beverage bottles without interfering with a content of the bottle and providing a function; and a unit for remotely acting on the devices of at least some of the beverage bottles with the use of internet so that the devices produce corresponding functions.

15 Claims, 2 Drawing Sheets

(56) References Cited

U.S. PATENT DOCUMENTS

| | | | |
|---|---|---|---|
| D318,224 S | 7/1991 | Altobelli | |
| 5,125,866 A | 6/1992 | Arad et al. | |
| 5,168,646 A | 12/1992 | Dippong et al. | |
| 5,201,431 A | 4/1993 | Berger et al. | |
| 5,211,699 A | 5/1993 | Tipton | |
| 5,297,247 A | 3/1994 | Kan | |
| 5,339,548 A | 8/1994 | Russell | |
| 5,379,916 A | 1/1995 | Martindale et al. | |
| 5,553,735 A | 9/1996 | Kimura | |
| 5,575,553 A | 11/1996 | Tipton | |
| 5,678,925 A | 10/1997 | Garmaise et al. | |
| 5,774,876 A * | 6/1998 | Woolley et al. | 705/28 |
| 5,823,346 A | 10/1998 | Weiner | |
| 5,863,752 A | 1/1999 | Court et al. | |
| 5,884,421 A | 3/1999 | Key | |
| 5,992,678 A | 11/1999 | Willey | |
| 6,037,872 A | 3/2000 | Dunnum | |
| 6,062,380 A | 5/2000 | Dorney | |
| 6,084,526 A * | 7/2000 | Blotky et al. | 340/691.6 |
| 6,158,870 A | 12/2000 | Ramirez | |
| D436,852 S | 1/2001 | Chan | |
| 6,213,616 B1 | 4/2001 | Chien | |
| 6,302,608 B1 | 10/2001 | Holmes et al. | |
| 6,393,401 B1 | 5/2002 | Loudermilk et al. | |
| D470,770 S | 2/2003 | Machado et al. | |
| 6,527,402 B1 | 3/2003 | Borri | |
| D473,469 S | 4/2003 | Claessen | |
| 6,588,131 B2 | 7/2003 | O'Connell, Jr. | |
| 6,588,593 B2 | 7/2003 | Woskoski | |
| 6,747,918 B2 | 6/2004 | Hight et al. | |
| 6,762,734 B2 | 7/2004 | Blotky et al. | |
| 6,872,116 B1 | 3/2005 | Dunnum et al. | |
| 6,923,549 B2 | 8/2005 | Hoy | |
| 6,945,418 B2 | 9/2005 | Guido et al. | |
| 7,000,343 B1 | 2/2006 | Teichman | |
| D521,388 S | 5/2006 | Andoh | |
| D521,389 S | 5/2006 | Andoh | |
| D522,865 S | 6/2006 | Andoh | |
| D523,346 S | 6/2006 | Andoh | |
| 7,152,832 B2 | 12/2006 | Wochnick | |
| 7,163,311 B2 | 1/2007 | Kramer | |
| 7,300,171 B2 | 11/2007 | Sutton | |
| D571,153 S | 6/2008 | Lopez | |
| 7,383,650 B2 | 6/2008 | Duesler | |
| D574,249 S | 8/2008 | Seum et al. | |
| D575,583 S | 8/2008 | Morgan | |
| 7,413,082 B2 | 8/2008 | Adler et al. | |
| D596,037 S | 7/2009 | Slubski | |
| 7,690,533 B2 | 4/2010 | Stilley | |
| D617,200 S | 6/2010 | Goldburt | |
| 7,824,051 B2 | 11/2010 | Walter et al. | |
| 7,837,333 B2 | 11/2010 | Chou et al. | |
| 7,934,845 B2 | 5/2011 | Yang | |
| 7,954,970 B2 | 6/2011 | Goldburt | |
| 8,056,273 B2 | 11/2011 | Goldburt | |
| 8,123,033 B2 | 2/2012 | Goldburt | |
| 8,232,981 B2 | 7/2012 | Sandy | |
| 2002/0097195 A1 | 7/2002 | Frank | |
| 2002/0104848 A1 | 8/2002 | Burrows et al. | |
| 2002/0126150 A1 | 9/2002 | Parry | |
| 2002/0190869 A1 | 12/2002 | Blotky et al. | |
| 2003/0076672 A1 | 4/2003 | Head | |
| 2003/0099158 A1 | 5/2003 | De la Huerga | |
| 2003/0122730 A1 | 7/2003 | Frank et al. | |
| 2003/0129283 A1 | 7/2003 | Martinez Carballido | |
| 2003/0226298 A1 | 12/2003 | Bjork | |
| 2004/0004829 A1 | 1/2004 | Policappelli | |
| 2004/0026357 A1 | 2/2004 | Beck et al. | |
| 2004/0118022 A1 | 6/2004 | Duesler | |
| 2004/0140286 A1 | 7/2004 | Zoller | |
| 2004/0148117 A1 | 7/2004 | Kirshenbaum et al. | |
| 2004/0206828 A1 | 10/2004 | Harris | |
| 2005/0024858 A1 | 2/2005 | Johnson | |
| 2005/0036301 A1 | 2/2005 | Haines | |
| 2005/0134461 A1 | 6/2005 | Gelbman et al. | |
| 2005/0152392 A1 * | 7/2005 | Lim et al. | 370/432 |
| 2005/0161558 A1 | 7/2005 | Stahl et al. | |
| 2005/0193612 A1 | 9/2005 | Lowry | |
| 2005/0205437 A1 | 9/2005 | Huffman et al. | |
| 2005/0207141 A1 | 9/2005 | Boesch et al. | |
| 2005/0229449 A1 | 10/2005 | Shepley | |
| 2005/0270396 A1 | 12/2005 | Miyashita et al. | |
| 2006/0087831 A1 | 4/2006 | Kramer | |
| 2006/0118507 A1 | 6/2006 | Feldman | |
| 2006/0139928 A1 | 6/2006 | Griffiths et al. | |
| 2006/0202042 A1 | 9/2006 | Chu | |
| 2006/0231109 A1 | 10/2006 | Howell et al. | |
| 2007/0024465 A1 | 2/2007 | Howell et al. | |
| 2007/0069883 A1 | 3/2007 | Collier et al. | |
| 2007/0091123 A1 | 4/2007 | Akashi | |
| 2007/0158293 A1 | 7/2007 | Andreani | |
| 2007/0299778 A1 * | 12/2007 | Haveson et al. | 705/51 |
| 2008/0023357 A1 | 1/2008 | Whiteis | |
| 2008/0034628 A1 | 2/2008 | Schnuckle | |
| 2008/0074625 A1 | 3/2008 | Lai et al. | |
| 2008/0100469 A1 | 5/2008 | Goldburt | |
| 2008/0128300 A1 | 6/2008 | Bahar et al. | |
| 2008/0149589 A1 | 6/2008 | Lach | |
| 2008/0264816 A1 | 10/2008 | Yeh | |
| 2008/0296191 A1 | 12/2008 | Ransch | |
| 2008/0314861 A1 | 12/2008 | Goldburt | |
| 2008/0317906 A1 | 12/2008 | Goldburt | |
| 2009/0293328 A1 | 12/2009 | Bull | |
| 2010/0101124 A1 | 4/2010 | Sorensen | |
| 2010/0182518 A1 | 7/2010 | Kirmse et al. | |
| 2010/0300913 A1 | 12/2010 | Goldburt | |
| 2010/0300914 A1 | 12/2010 | Goldburt et al. | |
| 2011/0100852 A1 | 5/2011 | Goldburt | |
| 2011/0100853 A1 | 5/2011 | Goldburt | |
| 2011/0122120 A1 | 5/2011 | Feuilloley | |
| 2011/0155604 A1 | 6/2011 | Goldburt | |
| 2011/0303579 A1 | 12/2011 | Sanders | |
| 2012/0171963 A1 | 7/2012 | Tsfaty | |
| 2012/0239470 A1 | 9/2012 | Goldburt | |
| 2013/0319892 A1 | 12/2013 | Goldburt | |
| 2014/0094126 A1 | 4/2014 | Sandy | |

OTHER PUBLICATIONS

International Search Report from PCT/US2009/006751, mailed Aug. 17, 2010.
Written Opinion from PCT/US2009/006751, mailed Aug. 17, 2010.
International Preliminary Report on Patentability from PCT/US2009/006751, mailed Nov. 29, 2011.

* cited by examiner

SYSTEM FOR AND METHOD OF ACTING ON BEVERAGE BOTTLES

BACKGROUND OF THE INVENTION

The present invention relates to a system for and method of acting on beverage bottles.

It is known to accommodate beverage containers in storage facilities, in beverage store selling facilities such as wine and liquor stores, in serving facilities such as bars of restaurants, etc. However, there is no system or method for acting on the beverage bottles so that they produce a corresponding functions as a group, or as an individual bottle in remote fashion and in a systematic way.

Beverage bottles provided with electrical or electronic devices which perform corresponding functions are disclosed in our patent application Ser. No. 11/588,494. It is therefore desirable to create a system and a method which provides systematic activation of corresponding beverage bottles in groups or individually.

SUMMARY OF THE INVENTION

Accordingly, it is an object of the present invention to provide a system for and a method of acting on beverage bottles.

In keeping with these objects and with others which will become apparent hereinafter, one feature of the present invention resides, briefly stated, in a system for acting on beverage bottles, comprising a plurality of bottles each provided with a device selected from the group consisting of an electrical device and an electronic device integrated in each of said beverage bottles without interfering with a content of the bottle and providing a function; and means for remotely acting on the devices of at least some of the beverage bottles with the use of internet so that said devices produce corresponding actions.

Another feature of the present invention resides, briefly stated, in a method for acting on a beverage bottle, comprising the steps of a plurality of bottles each provided with a device selected from the group consisting of an electrical device and an electronic device integrated in each of said beverage bottles without interfering with a content of the bottle and providing a function; and means for remotely acting on the devices of at least some of the beverage bottles with the use of internet so that said devices produce corresponding functions.

The novel features of which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
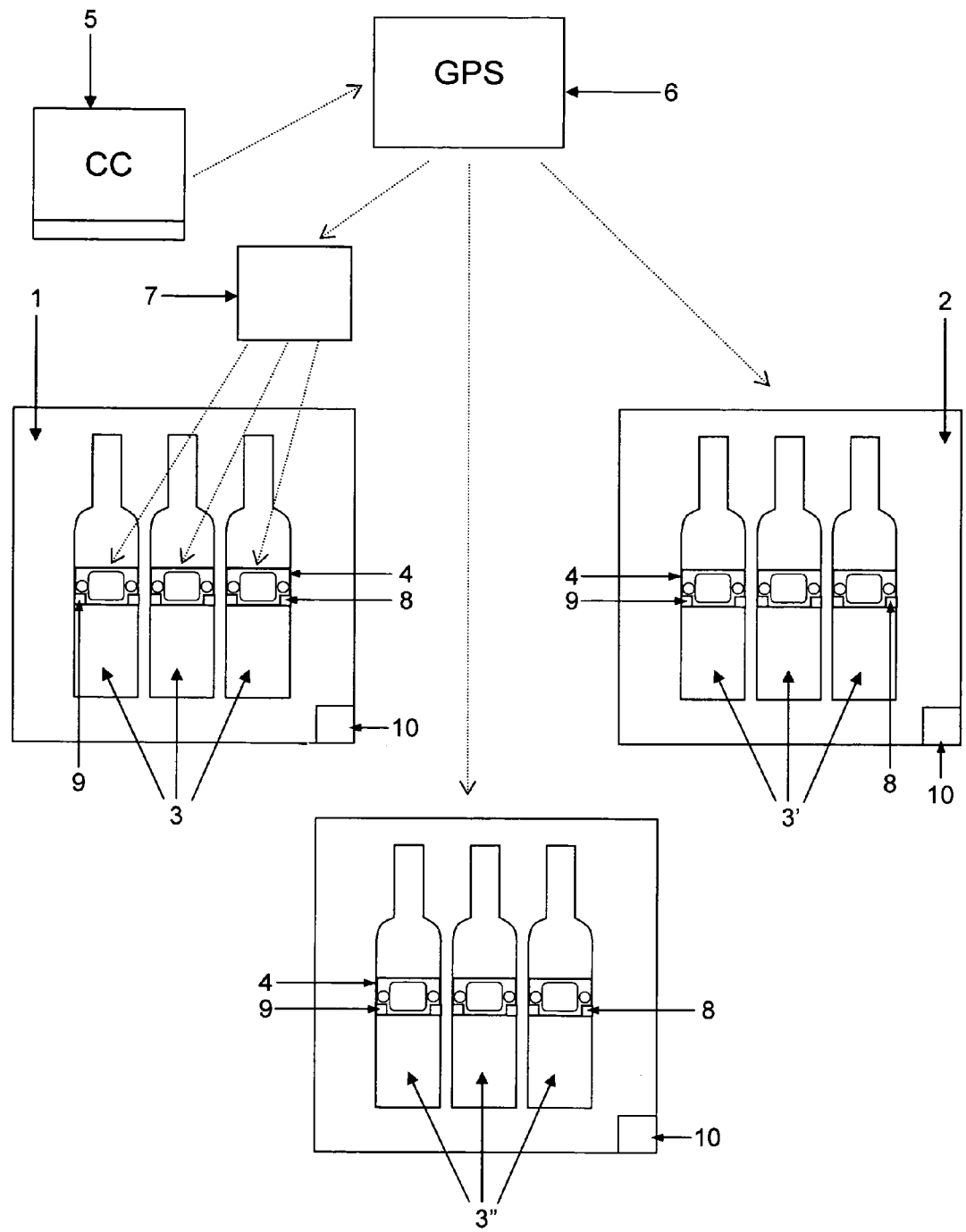
FIG. 1 of the drawings is a view schematically showing a system for and a method of acting on beverage bottles.

A system for and method of acting on beverage bottles shown in FIG. 1 has a plurality of beverage bottles which are provided with electrical or electronic devices as disclosed for example such as disclosed in our patent application Ser. No. 11/588,494. The beverage bottles can be located in different places or facilities, for example in a beverage storage facility 1 as identified with reference numeral 3, in a beverage store selling facility 2 as identified with reference numeral 3', in a beverage serving facility such as for example as a bar and restaurant 3", etc.

The bottles 3, 3', 3" are provided with electrical or electronic devices 4 which are disclosed on the above identified patent application. The electrical or electronic devices produce corresponding functions. For example, they cause illumination of the beverage which is contained in the corresponding bottle, they provide an electronic text message in the form of a running strip, etc., they display moving images for example films, etc.

The system in accordance with the present invention is provided with a central control station which is identified with reference numeral 5. It can be formed as an internet based computerized central control which generates and sends signals for corresponding control functions with the use of corresponding computer or computer equipment through the internet.

The central control station 5 activates the devices 4 provided in the bottles 3, 3', 3" so that the devices 4 perform corresponding above identified functions, as well as other functions as can be necessary. The central control station 5 transmits corresponding activation signals. The transmission can be performed for example via a satellite based GPS 6. The central control station 5 sends signals through the transmission device, for example the above identified GPS system, to corresponding bottles 3, 3', 3". The devices 4 in the bottles can be activated either individually for each bottle, or for a group of bottles, or for bottles arranged in the corresponding facility 1, or 2, or 3, or a combination thereof.

The transmission of the signals from the central control can be also performed through communication hubs 7 which are connected with the devices 4 of the bottles in the corresponding facilities.

It is to be understood that for the operation of the system and method each device 4 of the bottle can be provided with a corresponding signal receiver 8 for receiving the signals for activating the device 4 of the corresponding bottle.

Code means are further provided. The code means can include a code 9 attached to each bottle, or a code 10 attached to the corresponding facility 1, 2, or 3, so that the signals which are transmitted from the central control station 5 are provided with the corresponding code to activate a corresponding bottle, a corresponding group of bottles, or bottles in a corresponding facility 1, 2 or 3.

As for the construction and the operation of the electrical or electronic devices 4, in an exemplary embodiment it can be identical to the construction and operation of the electronic devices disclosed in our patent application Ser. No. 11/588, 494.

Figure 2:
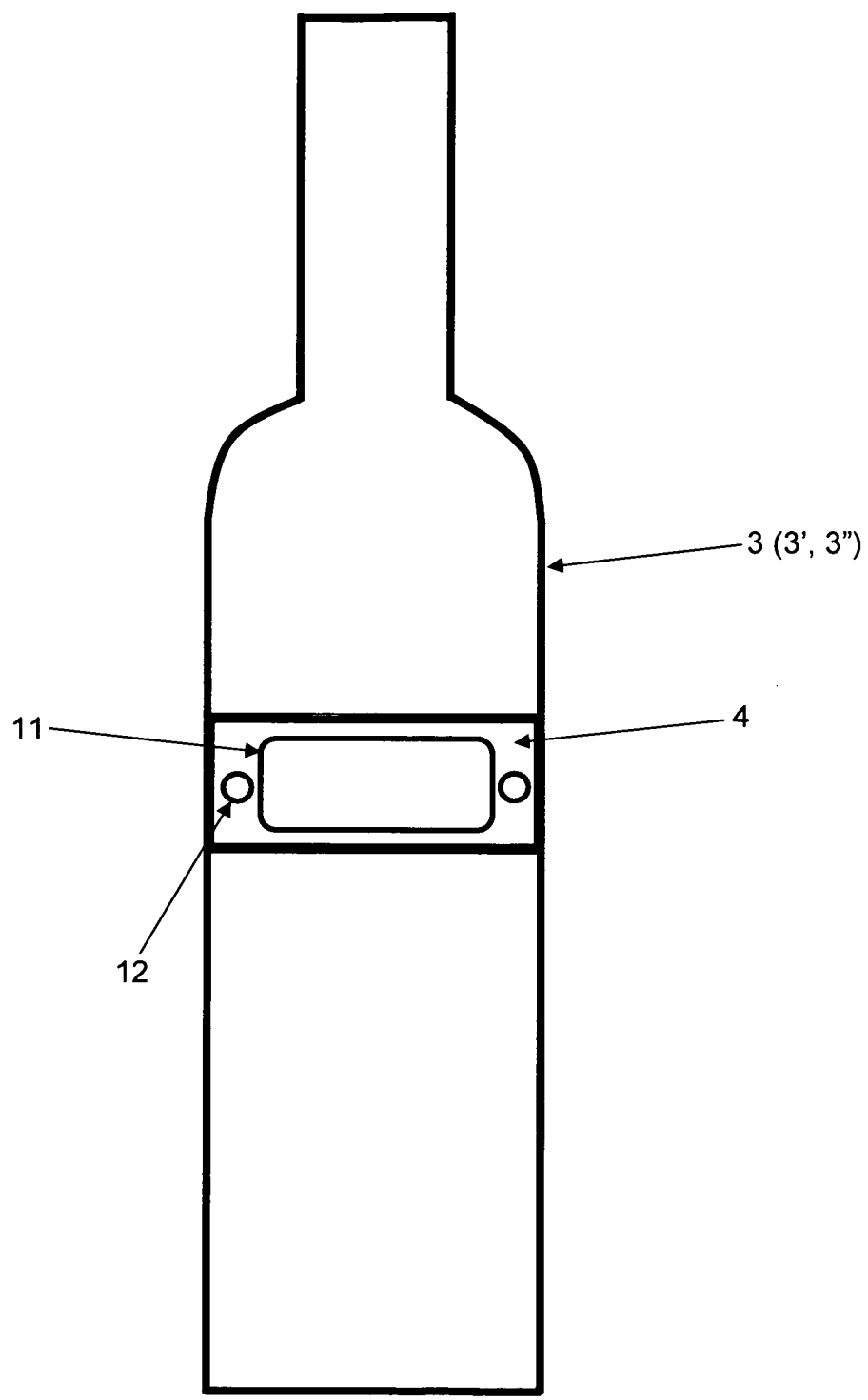
FIG. 2 is a view showing a beverage bottle of the inventive system and method.

FIG. 2 shows an example of the bottle 3, whose action is activated in the inventive system and method. The device 4 of the bottle 3 can be provided for example, with a screen 11 and speakers 12, for displaying on the screen 11 of video images, movies, videos transmitted via the internet and playing audio, music, speech, etc. by the speakers 12 to accompany the screen display.

It will be understood that each of the elements described above, or two or more together, may also find a useful application in other types of constructions differing from the type described above.

While the invention has been illustrated and described as embodied in a system for and method of acting on beverage bottles, it is not intended to be limited to the details shown, since various modifications and structural changes may be made without departing in any way from the spirit of the present invention.

Without further analysis, the foregoing will so fully reveal the gist of the present invention that others can, be applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

The invention claimed is:

1. A system, comprising
a plurality of beverage bottles collocated at a facility, each beverage bottle of the plurality of beverage bottles comprising an electronic device integrated into the beverage bottle without interfering with a content of the beverage bottle, the electronic device comprising a receiver, a display and speakers; and
a computing device communicatively connected to electronic devices of the plurality of beverage bottles via a network, wherein the computing device is to:
identify that the plurality of beverage bottles are collocated at the facility; and
transmit activation signals to the electronic devices of the plurality of beverage bottles that are collocated at the facility;
wherein the electronic devices of the plurality of beverage containers are to perform the following operations together as a group responsive to receipt of the activation signals:
activate;
display images using the display; and
output audio via the speakers.

2. A system as defined in claim 1, wherein said electronic device further comprises a GPS receiver.

3. A system as defined in claim 2, wherein the network comprises a public internet, the system further comprising:
a communication hub communicatively connected to the electronic devices of the plurality of beverage bottles, wherein the communication hub is located at the facility and connected to the computing device via the public internet, the communication hub to receive the activation signals from the computing device and transmit the activation signals to the electronic devices of the plurality of beverage bottles.

4. A system as defined in claim 1, wherein said facility is selected from the group consisting of a storage facility, a beverage store selling facility and a beverage serving facility.

5. A system as defined in claim 1, wherein said display is to display at least one of an electronic text message in a form of a running strip or moving images.

6. A system as defined in claim 1, wherein said display is to display at least one of video images or movies, and said speakers are to output at least one of music or speech.

7. The system of claim 1, wherein the electronic device further comprises an illumination module to illuminate contents of the beverage bottle, and wherein the electronic devices of the plurality of beverage containers are to illuminate contents of the plurality of beverage bottles together as a group responsive to receipt of the activation signals.

8. The system of claim 1, wherein the computing device is further to transmit the video and the audio to the electronic devices of the plurality of beverage bottles via the network.

9. A method comprising:
identifying, by a computing device and via a network, a plurality of beverage bottles that are collocated at a facility, each beverage bottle of the plurality of beverage bottles comprising an electronic device integrated into the beverage bottle without interfering with a content of the beverage bottle, the electronic device comprising a receiver, a display and speakers; and
transmitting, by the computing device, messages comprising activation signals to electronic devices of the plurality of beverage bottles that are collocated at the facility, wherein the messages cause the electronic devices of the plurality of beverage bottles to activate, display images using the display and output audio via the speakers together as a group.

10. A method as defined in claim 9, wherein said electronic device further comprises a GPS receiver.

11. A method as defined in claim 10, wherein transmitting the messages to the electronic devices of the plurality of beverage bottles comprises:
transmitting the messages to a communication hub located at the facility and communicatively connected to the electronic devices; and
causing the communication hub to transmit the messages to the electronic devices of the plurality of beverage bottles.

12. A method as defined in claim 9, wherein said facility is selected from the group consisting of a storage facility, a beverage store selling facility and a beverage serving facility.

13. A method as defined in claim 9, wherein displaying the images comprises at least one of displaying an electronic text message in a form of a running strip or displaying a moving image.

14. A method as defined in claim 9, wherein said messages comprise at least one of images, movies, videos, music or speech.

15. The method of claim 9, wherein the messages further cause illumination modules of the electronic devices to illuminate contents of the plurality of beverage bottles together as a group.

* * * * *

UNITED STATES PATENT AND TRADEMARK OFFICE
CERTIFICATE OF CORRECTION

| | |
|---|---|
| PATENT NO. | : 9,152,968 B2 |
| APPLICATION NO. | : 11/821349 |
| DATED | : October 6, 2015 |
| INVENTOR(S) | : Tim Goldburt |

Page 1 of 1

It is certified that error appears in the above-identified patent and that said Letters Patent is hereby corrected as shown below:

In the claims

In claim 1, col. 3, line 30, delete "containers" and insert --bottles--

In claim 7, col. 4, line 7, delete "containers" and insert --bottles--

Signed and Sealed this
Fifth Day of April, 2016

Michelle K. Lee
*Director of the United States Patent and Trademark Office*